UNITED STATES PATENT OFFICE 2,725,387
Patented Nov. 29, 1955

2,725,387

REACTION OF α-SUBSTITUTED ACROLEINS WITH ALCOHOLS TO FORM ALKOXY-δ-LACTONES

Benjamin Thompson, Kingsport, Tenn., assignor to Eastman Kodak Company, Rochester, N. Y., a corporation of New Jersey No Drawing. Application September 22, 1949,
Serial No. 117,274

4 Claims. (Cl. 260—343.5)

This invention relates to the reaction of α-substituted acroleins with alcohols in the presence of strongly alkaline catalysts, to form alkoxy-δ-lactones.

It is known that unsaturated aldehydes react with alcohols in the presence of a mineral acid catalyst to form acetals of β-alkoxyaldehydes (see United States Patent 2,288,211, dated June 30, 1942). A related process comprising reacting α-substituted acroleins with polyhydric alcohols in the presence of a small amount of acid catalyst to form resinous products, is also known (see United States Patent 2,401,776, dated June 11, 1946). Acrolein is known to undergo the aldol condensation in the presence of an alkaline catalyst. It is also known that acrylonitrile reacts with alcohols, in the presence of a strongly alkaline catalyst, with addition of the alcohol to the double bond to form β-alkoxypropiononitriles.

I have now found that an α-substituted acrolein and an alcohol react, in the presence of a strongly alkaline catalyst, in a novel and unexpected manner with the formation of new δ-lactones, instead of β-alkoxyaldehydes which would have been expected to form by means of the alcohol splitting into its alkoxy and hydrogen components and adding at either side of the double bond of the α-substituted acrolein, e. g. methanol would be expected to react with α-methacrolein to produce β-methoxyisobutyraldehyde as follows:

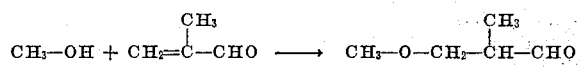

After my surprising discovery, I found that such β-alkoxy aldehydes can be obtained at temperatures below 0° C., thus the reaction of α-methacrolein with excess methanol in the presence of sodium methylate at —20° C. results in the production of β-methoxyisobutyraldehyde. To isolate this product at ambient temperatures, the catalyst should be destroyed before the mixture is warmed up. My invention, however, is not concerned with such products but only with my newly-discovered δ-lactones and the process for their production at temperatures in excess of 0° C.

The mechanism of the reaction can be illustrated using α-methacrolein, ethyl alcohol, and sodium ethoxide as the catalyst. Although the exact mechanism of the reaction is not known, it appears that the reaction may take any one or a combination of two or more of the following six courses.

1. The dimerization of the α-methacrolein takes place in the catalytic presence of sodium ethoxide, as follows:

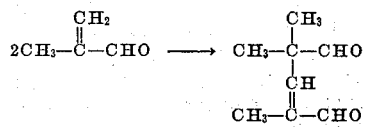

The dimer then adds ethyl alcohol and the two aldehyde groups react with each other, one being oxidized and the other reduced, to form an ethoxy-δ-lactone:

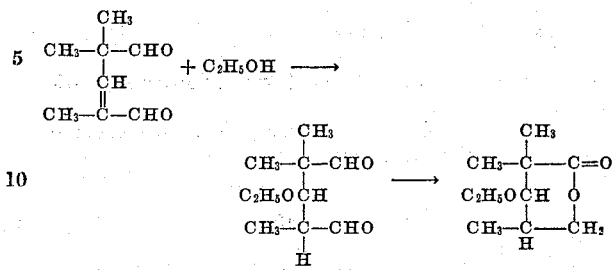

This δ-lactone is that of β-ethoxy-δ-hydroxy-α,α,γ-trimethylvaleric acid.

2. The α-methacrolein dimerizes in the catalytic presence of sodium ethioxide according to the vinyl head-to-tail mechanism:

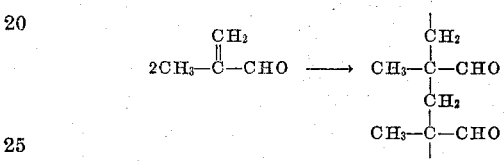

Then the dimer is deactivated, by the addition of ethyl alcohol:

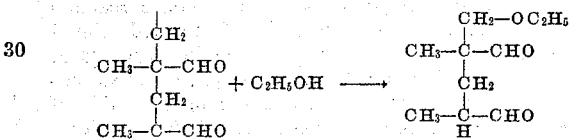

Whereupon, the two aldehyde groups react with each other, one being oxidized and the other reduced, to form an ethoxy-δ-lactone:

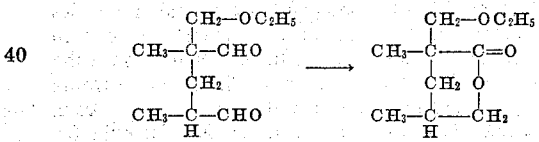

This δ-lactone is that of a α-ethoxymethyl-δ-hydroxy-α,γ-dimethylvaleric acid.

3. The α-methacrolein in the catalytic presence of sodium ethoxide undergoes a reaction involving a hydrogen atom on the α-methyl group, which is activated by the double bond, forming an unsaturated dialdheyde:

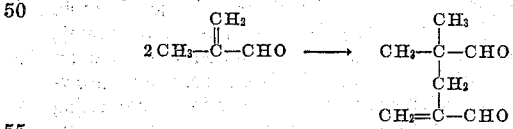

Then, the unsaturated dialdehyde adds ethyl alcohol:

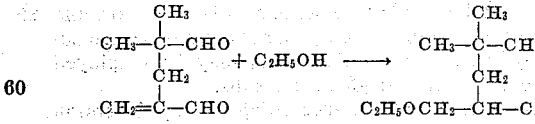

Whereupon, the two aldehyde groups react with each other, one being oxidized and the other reduced, to form an ethoxy-δ-lactone:

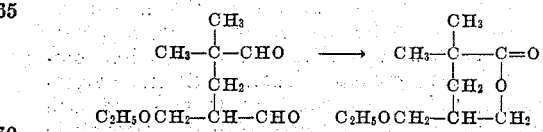

This δ-lactone is that of γ-ethoxymethyl-δ-hydroxy-α,α-dimethylvaleric acid.

4. In 1 above, the two aldehyde groups may undergo oxidation-reduction to form:

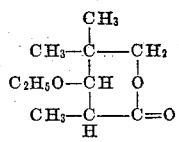

This δ-lactone is that of β-ethoxy-δ-hydroxy-α,γ,γ-trimethylvaleric acid.

5. In 2 above, the two aldehyde groups may undergo oxidation-reduction to form:

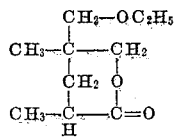

This δ-lactone is that of γ-ethoxymethyl-δ-hydroxy-α,γ-dimethylvaleric acid.

6. In 3 above, the two aldehyde groups may undergo oxidation-reduction to form:

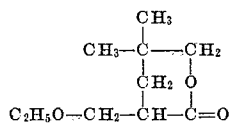

This δ-lactone is that of α-ethoxymethyl-δ-hydroxy-γ,γ-dimethylvaleric acid.

These illustrative possibilities are based on a reaction wherein 2 moles of α-methacrolein are reacted with 1 mole of ethyl alcohol resulting in 6 possible isomers of trimethylethoxy-δ-valerolactone. However, it is also possible to react these components in the molar ratios of 3:1 (α-substituted acrolein to alcohol), 4:1, 5:1, 6:1, etc., resulting in the formation of higher molecular weight alkoxy-δ-lactones consisting mainly of a combination of three or more molecules of α-substituted acrolein with one molecule of alcohol. Such products appear to consist of alkoxy-δ-valerolactones with additional molecules of the α-substituted acrolein intramolecularly bonded in chain-like sequence thereto; e. g., the dimer may have the formula $C_{10}H_{18}O_3$, the trimer may have the formula $C_{14}H_{24}O_4$, the quadrimer the formula $C_{18}H_{30}O_5$, etc., each differing by $C_4H_6O$ which is the molecular formula for the α-substituted acrolein, $CH_2=C(CH_3)—CHO$, utilized in this exemplary series.

Another variation is to employ two or more different α-substituted acroleins and an alchol, thus forming an alkoxy-δ-lactone having the substituted groups of both acroleins. Thus, while α-methacrolein reacts with ethyl alcohol to give an alkoxy-δ-lactone of the formula $C_{10}H_{18}O_3$ (e. g., ethoxymethyl-dimethyl-δ-valerolactone), and α-ethacrolein reacts with ethyl alcohol to give an alkoxy-δ-lactone of the formula $C_{12}H_{22}O_3$ (e. g. an ethoxymethyl-diethyl-δ-valerolactone), a reaction comprising both of these α-substituted acroleins with ethyl alcohol would give both of the above alkoxy-δ-lactones and, in addition, another alkoxy-δ-lactone of the formula $C_{11}H_{20}O_3$ (e. g. an ethoxymethyl-methyl-ethyl-δ-valerolactone). Also, two or more alcohols may be employed with correspondingly self-evident results.

The δ-lactones produced according to my invention have a wide range of properties which make them valuable for a number of uses such as solvents, plasticizers, perfumes, etc., and as intermediate compounds in the preparation of other compounds. Tests have shown that the δ-lactones referred to hereinafter are compatible with cellulose esters such as cellulose acetate, cellulose propionate, cellulose aceto-propionate, cellulose acetobutyrate, etc., and can be employed to plasticize such cellulose esters. When employing polyhydric alcohols in the process of my invention, e. g. glycerol, pentaerythritol, etc., the high boiling products obtained have application in the synthetic coatings industry as modifiers for alkyd resins, etc.

It is, therefore, an object of my invention to provide new δ-lactones. A further object is to provide a process for preparing such δ-lactones. Other objectives will become apparent hereinafter.

In accordance with my invention, δ-lactones are prepared by reacting an α-substituted acrolein with an alcohol, in the presence of a strongly alkaline catalyst at temperatures in excess of 0° C.

My invention embraces the use of α-substituted acroleins having the formula:

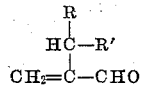

wherein R and R' each represents a hydrogen atom or an alkyl radical. Advantageously the sum of the carbon atoms in R and R' taken together does not exceed 3, thus R and R' each represents a hydrogen atom or a methyl, ethyl, propyl or isopropyl radical. Most advantageously, R represents a hydrogen atom, and R' represents either a hydrogen atom or a methyl radical.

Such α-substituted acroleins include α-methacrolein, α-ethacrolein, α-n-propylacrolein, α-n-butylacrolein, α-isopropylacrolein, α-sec. butylacrolein, and α-isobutylacrolein.

The reacting alcohols employed in the process of my invention can be selected from among any of the aliphatic and aromatic mono and polyhydric alcohols. Advantageously, I employ at least one of the alcohols containing from 1 to 10 carbon atoms selected from among the alkanols, the alkoxyalkanols, the hydroxyalkoxyalkanols, the alkoxyalkoxyalkanols, the alkane diols, the alkane triols, the alkane tetrols, and the aralkanols containing from 7 to 8 carbon atoms. Especially useful δ-lactones are obtained by employing alcohols containing from 1 to 4 carbon atoms. Examplary alcohols which can be employed include methyl alcohol, ethyl alcohol, isopropyl alcohol, propyl alcohol, butyl alcohol, tertiary butyl alcohol, isobutyl alcohol, 2-ethylhexanol, octyl alcohol, nonyl alcohol, glycols (e. g. ethylene glycol), hexane diols, diethylene glycol, Cellosolve (viz. β-ethoxyethyl alcohol), Carbitol (viz. diethylene glycol monoethyl ether), β-hydroxyethyl alcohol, β-hydroxypropyl alcohol, glycerol, pentaerythritol, 2,2,4,4-tetramethylol cyclohexanol, sorbitol, etc.

The reaction can be catalyzed by employing at least one of the strongly alkaline compounds selected from the alkali metal and quaternary ammonium bases. Advantageously, I employ an amount of such catalysts from about 0.1 to about 5 molar per cent of the α-substituted acrolein being reacted, although larger or smaller amounts can be employed. Such catalyst bases include the alkali metals, alkali metal oxides, hydroxides, nitrides, amides, alcoholates, etc., and the aralkyltrialkyl quaternary ammonium and the tetraalkylquaternary ammonium hydroxides and alcoholates where the alkyl groups contain from 1 to 4 carbon atoms and the aralkyl group contains from 7 to 8 carbon atoms. In lieu of employing the alkali metal alcoholates as such, they may be advantageously formed in the reaction mixture by adding an alkali metal to the reaction mixture wherein it will react with the alcohol present to form the corresponding alkali metal alcoholate. Thus, the alcoholates which can be employed can be advantageously prepared from any of the alcohols used in the reaction itself as defined above. Typical alcohols which can be employed are also listed above. Typical examples of such catalysts which I can employ advantageously include sodium methylate, sodium ethylate, potassium n-propylate, tetramethylammonium isobutylate, benzyltrimethylammonium n-butylate, potassium β-ethoxyethylate, potassium oxide, potassium hydroxide, sodium nitride and sodium amide.

Upon completion of the reaction being catalyzed, the catalyst can be destroyed, if desired, by neutralization with an equivalent quantity of acid, e. g. $H_2SO_4$, or in the case of the quaternary ammonium catalysts, they can be destroyed by heating the reaction mixture, e. g. to about 150° C. or higher.

The advantageous temperature range employed in carrying out my process is from 0°–75° C. However, higher temperatures can be used depending on the properties of the reactants employed. Thus the reaction can be carried out at its reflux temperature. The most advantageous temperature range is from 10° to 50° C.

A nitrogen atmosphere is advantageously used in practicing my invention, but any inert atmosphere can be used, or the reaction can be carried out in a closed system so that there is little chance of contact or oxidation of the acrolein by oxygen which might cause undesirable polymerization. An inert atmosphere is desirable but not critical.

A polymerization inhibitor such as hydroquinone, p-phenylenediamine, etc., can be employed in practicing my invention, but such an inhibitor is not necessary. If an inhibitor such as hydroquinone is used, it can be destroyed, prior to separation of the desired lactones from the reaction mixture, by air oxidation or extraction.

The following examples will serve to illustrate further the practice of my invention.

*Example 1*

Three moles of anhydrous ethanol and 0.1 mole of metallic sodium were fed into a 3-neck flask containing a stirrer, feed burette, reflux condenser, thermometer, and nitrogen inlet tube. When the sodium had dissolved, the remaining oxygen was flushed out of the flask with nitrogen. The mixture was cooled to 20° C. in a 0° C. bath. Then 2.5 moles of α-methacrolein was fed into the stirred mixture at a rate such that the heat of reaction could be removed by cooling. The temperature was maintained in the 10°–30° C. range. This required approximately 1½ hours. The reaction mixture was then vacuum distilled without further treatment. Very little α-methacrolein remained unreacted. The unreacted ethyl alcohol was distilled off and the pressure reduced to 1 mm. of Hg pressure. The main product, $C_{10}H_{18}O_3$ (e. g., an ethoxy-trimethyl-δ-valerolactone) was recovered by distillation in a 60–75% yield. The $C_{10}H_{18}O_3$ had a boiling point between 92°–95° C. at 1 mm. of Hg pressure. The distillation was continued and a second δ-lactone, $C_{14}H_{24}O_4$, boiling at 135° C.–140° C. at 1 mm. Hg of pressure, was obtained in a yield of 10–20%. The product having the formula $C_{10}H_{18}O_3$ has the following structural formula:

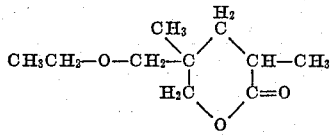

which is alpha, gamma-dimethyl-gamma-ethoxymethyl-delta-valerolactone.

*Example 2*

The procedure of Example 1 was repeated except that 2.5 moles of α-ethacrolein was used instead of α-methacrolein. The main product was δ-lactone, $C_{12}H_{22}O_3$, boiling at 110°–115° C. at 1 mm. of Hg pressure. This product was an ethoxy-diethyl-methyl-δ-valerolactone. Additional distillation resulted in the recovery of higher molecular weight products in small yields.

*Example 3*

The procedure of Example 1 was repeated except that 18 moles of n-butanol was used instead of ethyl alcohol, 0.3 mole sodium instead of 0.1 mole, and 6 moles of α-methacrolein instead of 2.5 moles, and except that the reaction was run for 3 hours instead of 1½, after which time the catalyst was neutralized with 0.15 mole of 50%  $H_2SO_4$. The main product was a 70–85% yield of a butoxy-trimethyl-δ-valerolactone, $C_{12}H_{22}O_3$, boiling at 130° C. at 3 mm. of Hg pressure.

*Example 4*

The procedure of Example 1 was repeated except that 1.7 moles of Cellosolve (ethylene glycol monoethyl ether) was used instead of 3 moles of ethyl alcohol and only 2.0 moles of α-methacrolein was employed. The main product was a β-ethoxy-ethoxytrimethyl-δ-valerolactone, $C_{12}H_{22}O_4$, boiling at 138° C. at 1 mm. of Hg pressure.

*Example 5*

One mole of ethylene glycol and 0.1 mole of metallic sodium were fed into a 3-neck flask equipped as in Example 1. When the sodium had dissolved, the remaining oxygen was flushed out of the flask with nitrogen. The mixture was cooled to 20° C., and 2.5 moles of α-methacrolein was fed into the glycol-catalyst mixture at 15° to 20° C. with constant stirring. The reacting mixture was then stirred for approximately 4 hours at 25° to 30° C. The resulting product was a viscous syrup which was treated with acid as in Example 3 and washed with water in order to neutralize and remove the alkaline catalyst. The oil resulting was then distilled on a molecular still. The major product comprised a mixture of the mono and dilactone ethers of the glycol, viz. $C_{10}H_{18}O_4$ and $C_{18}H_{30}O_6$. The structural formulae might be any of six possible isomers as indicated previously. Selecting the isomer numbered 1 above, the diether $C_{18}H_{30}O_6$ would have the following configuration:

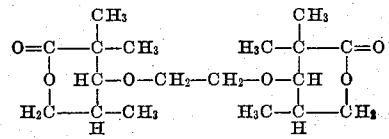

By varying the amount of sodium from 0.01 to 0.1 mole and varying the quantity of α-methacrolein from 2.0 to 3.5 moles, similar results were obtained. The proportion of the monoether to the diether depends upon the molar ratio of the α-methacrolein to the glycol.

*Example 6*

In a manner similar to that set forth in Example 1, 0.3 mole of sodium was dissolved in 15 moles of 2-ethylhexanol. The reaction vessel was then flushed out with nitrogen. Then, over a period of from 3 to 4 hours, 6 moles of α-methacrolein was fed into the 2-ethylhexanol solution which was constantly stirred and maintained at a temperature of from 40° to 50° C. The reaction mixture was allowed to stand for 2 hours after all of the reaction heat had disappeared. Then the alkaline catalyst was neutralized with dilute acid as in Example 3 and washed out. A 45% yield of a 2-ethylhexoxy-δ-valerolactone of the formula $C_{16}H_{30}O_3$ was obtained. This δ-lactone has a boiling point of 145°–150° C. at 1 mm. of Hg pressure. In addition to this principal product, a yield of about 50 to 55% of higher condensation products was obtained.

*Example 7*

Six moles of α-methacrolein and six moles of ethyl alcohol were fed into a reaction vessel. The mixture was cooled to 20° C. and 0.02 mole of catalyst comprising a 25% solution of trimethylbenzylammonium butoxide dissolved in butanol was fed into the vessel gradually over a period of approximately one hour; the rate of feeding was such that the reaction temperature was maintained between 20° and 35° C. The mixture was stirred for an additional hour and then the catalyst was destroyed by heating the mixture above 150° C. The alkoxy-δ-lactone, $C_{10}H_{18}O_3$, boiling at 92°–95° C. at 1 mm. of Hg pressure, was recovered by distillation in a yield of less than 20%. Further distillation was used to recover the main product, an alkoxy-δ-lactone with the empirical formula $C_{14}H_{24}O_4$, boiling at 135°–140° C. at 1 mm. of Hg pressure, in a 45–60% yield.

*Example 8*

40 parts by weight of the alkoxy-δ-lactone of the formula $C_{12}H_{22}O_3$ (prepared from α-ethacrolein and ethyl alcohol by the method set forth in Example 2) were mixed with 100 parts by weight of cellulose acetate-propionate. The result was a homogeneous plastic of medium flow having a moisture absorption of 2.6%, 0.1% loss by leaching, and only 0.7% loss in the standard heat test for permanence.

My process is advantageously carried out on an industrial scale in the following continuous manner. A solution of the α-substituted acrolein, the desired alcohol, the alkaline catalyst and the δ-lactone product is maintained between approximately 10° and 50° C. in a suitable vessel. A portion of this main body of solution is substantially continuously withdrawn and divided into two parts. One part of this withdrawn solution is subjected to cooling by means of a suitable heat exchanger (in order to maintain the reaction mixture within the temperature range desired for the particular reaction being conducted) and additional α-substituted acrolein, alcohol and catalyst are added, whereupon this part of the withdrawn solution is returned to the main body of the solution. A rapid, turbulent dispersal of the catalyst into the solution is important. The other part of the solution, which was withdrawn from the main body of the solution, is allowed to react for an additional length of time, and then the catalyst is neutralized and the δ-lactone separated therefrom. The neutralization of the catalyst can be carried out by using a dilute mineral acid. The salt, thus formed, dissolves when water is added and can be separated from the crude alkoxy-δ-lactone product as a lower layer in the case of higher alcohols, or as a lower phase after distilling off the unreacted α-substituted acrolein and alcohol.

In a manner similar to that illustrated in the foregoing examples, α-n-propylacrolein, α-n-butylacrolein, α-isobutylacrolein, etc. can be reacted separately or in various proportions with methyl, ethyl, n-propyl, isopropyl, n-butyl, isobutyl, benzyl alcohol, etc. separately or mixed together, thereby producing various alkoxy-δ-lactones and mixtures thereof. Thus α-n-propylacrolein can be reacted with benzyl alcohol in the presence of potassium n-propylate to produce a benzoxy-δ-lactone, possibly α-benzoxymethyl-α,γ-di-n-propyl-δ-valerolactone or an isomer thereof. Or, α-isopropylacrolein can be reacted with n-butyl alcohol in the presence of sodium isobutylate to produce an n-butoxy-δ-lactone, possibly β-butoxy-α-methyl-α,γ-di-n-butyl-δ-valerolactone or an isomer thereof. Alternatively, α-isobutylacrolein can be reacted with isopropyl alcohol in the presence of potassium β-ethoxyethylate to produce an isopropoxy-δ-lactone, possibly α-isopropoxy-α,γ-diisobutyl-δ-valerolactone or an isomer thereof.

What I claim as my invention and desire to secure by Letters Patent of the United States is:

1. A process for the production of a substituted delta-valerolactone, said process comprising condensing methacrolein and an alcohol under substantially anhydrous conditions in the presence of a basic condensation catalyst and distilling the condensate in the presence of a basic condensation catalyst.

2. A process for preparing δ-lactones comprising reacting under substantially anhydrous conditions α-methacrolein with an alkane diol containing from 2 to 10 carbon atoms at a temperature in excess of 0° C. and in the catalytic presence of from 0.1 to 5 molar percent based on the weight of α-methacrolein of a strongly alkaline compound selected from the group consisting of the alkali metals, the alkali metal bases and the quaternary ammonium bases, the ratio of the α-methacrolein to alkane diol being from 3:1 to 1:1 whereby δ-lactone molecules formed contain a ratio of α-methacrolein groups to alkane diol groups of from 6:1 to 2:1.

3. A process for preparing δ-lactones comprising reacting under substantially anhydrous conditions α-methacrolein with ethylene glycol at a temperature of from 0° C. to 75° C. in the catalytic presence of from 0.1 to 5 molar percent based on the weight of α-methacrolein of a strongly alkaline compound selected from the group consisting of the alkali metals, the alkali metal bases and the quaternary ammonium bases, the ratio of the α-methacrolein to ethylene glycol being from 3:1 to 1:1 whereby the δ-lactone molecules formed contain a ratio of α-methacrolein groups to ethylene glycol groups of from 6:1 to 2:1.

4. A process for preparing δ-lactones comprising reacting under substantially anhydrous conditions α-methacrolein with ethylene glycol at a temperature of from 10° C. to 50° C. in the catalytic presence of from 0.1 to 5 molar percent based on the weight of α-methacrolein of sodium, said reaction being conducted in an inert atmosphere, the ratio of the α-methacrolein to ethylene glycol being from 3:1 to 1:1 whereby the δ-lactone molecules formed contain a ratio of α-methacrolein groups to ethylene glycol groups of from 6:1 to 2:1.

References Cited in the file of this patent

UNITED STATES PATENTS

| | | |
|---|---|---|
| 1,962,157 | Seymour | June 12, 1934 |
| 2,122,719 | Kreimeier | July 5, 1938 |
| 2,212,894 | Allen | Aug. 27, 1940 |
| 2,356,459 | Kung | Aug. 22, 1944 |
| 2,368,366 | Kyrides | Jan. 30, 1945 |
| 2,428,015 | Daniels et al. | Sept. 30, 1947 |
| 2,429,799 | Bremner | Oct. 28, 1947 |
| 2,504,680 | Gresham | Apr. 18, 1950 |
| 2,526,702 | Smith | Oct. 24, 1950 |

FOREIGN PATENTS

| | | |
|---|---|---|
| 608,985 | Great Britain | 1946 |

OTHER REFERENCES

Curtman: "Qualitative Chemical Analysis," 1932, MacMillan Co., N. Y., pp. 412–13.